US012477981B2

(12) United States Patent
Lorriette

(10) Patent No.: US 12,477,981 B2
(45) Date of Patent: Nov. 25, 2025

(54) RESIDUE SPREADER FOR A COMBINE HARVESTER

(71) Applicant: AGCO International GmbH, Neuhausen (CH)

(72) Inventor: Patrick Lorriette, Clermont (FR)

(73) Assignee: AGCO International GmbH, Neuhausen (CH)

( * ) Notice: Subject to any disclaimer, the term of this patent is extended or adjusted under 35 U.S.C. 154(b) by 811 days.

(21) Appl. No.: 17/778,830

(22) PCT Filed: Nov. 23, 2020

(86) PCT No.: PCT/EP2020/083060
§ 371 (c)(1),
(2) Date: May 21, 2022

(87) PCT Pub. No.: WO2021/099634
PCT Pub. Date: May 27, 2021

(65) Prior Publication Data
US 2023/0028281 A1  Jan. 26, 2023

(30) Foreign Application Priority Data
Nov. 22, 2019 (GB) ..................... 1917035

(51) Int. Cl.
*A01D 41/12* (2006.01)
*A01D 41/127* (2006.01)

(52) U.S. Cl.
CPC ....... *A01D 41/1243* (2013.01); *A01D 41/127* (2013.01)

(58) Field of Classification Search
CPC .......................... A01D 41/1243; A01D 41/127
See application file for complete search history.

(56) References Cited

U.S. PATENT DOCUMENTS 4,573,483 A * 3/1986 Raineri ............... A01D 75/282
460/8
4,921,469 A 5/1990 Scharf
(Continued)

FOREIGN PATENT DOCUMENTS

EP  1985170 A1  10/2008
EP  2225929 A1 * 9/2010 ......... A01D 41/1243
(Continued)

OTHER PUBLICATIONS

UK Intellectual Property Office, Search report for related UK Application No. GB1917035.6, dated May 18, 2020.
(Continued)

*Primary Examiner* — Joseph M Rocca
*Assistant Examiner* — Douglas J Meislahn

(57) ABSTRACT

A residue spreader for receiving crop residue from a residue chopper of a combine harvester and for spreading crop residue onto the ground. The spreader includes a spreader body having an inlet and an outlet side, and left and right groups of deflectors, each deflector pivotally mounted on the spreader body in juxtaposed position and configured to laterally deflect the crop residue between the inlet side and the outlet side. The deflectors within each group are coupled together for pivoting movement in unison. A distribution actuator has an actuator body and an actuator element and the actuator body is mounted to the spreader body. The actuator element is coupled to both the left and right groups of deflectors by respective pivoting links. The actuator body is adjustably mounted to the spreader body. An adjustment actuator is connected to the actuator body to control movement of the actuator body with respect to the spreader body to adjust a spread width.

10 Claims, 5 Drawing Sheets

(56) References Cited

U.S. PATENT DOCUMENTS

| | | | |
|---|---|---|---|
| 5,569,081 | A | 10/1996 | Baumgarten et al. |
| 6,840,853 | B2 | 1/2005 | Foth |
| 6,908,379 | B2 | 6/2005 | Gryspeerdt et al. |
| 6,939,221 | B1 | 9/2005 | Redekop et al. |
| 7,331,855 | B2 | 2/2008 | Johnson et al. |
| 8,010,262 | B2 | 8/2011 | Schroeder et al. |
| 8,708,157 | B2 * | 4/2014 | Gibson .................. B07B 13/10 |
| | | | 209/696 |
| 10,362,732 | B2 | 7/2019 | Baumgarten et al. |
| 2002/0072400 | A1 | 6/2002 | Foth |
| 2004/0053652 | A1 * | 3/2004 | Duquesne .......... A01D 41/1243 |
| | | | 460/112 |
| 2011/0302897 | A1 * | 12/2011 | Hoffman ................ A01D 43/10 |
| | | | 56/192 |
| 2013/0324199 | A1 * | 12/2013 | Roberge ............. A01D 41/1243 |
| | | | 460/111 |
| 2014/0096498 | A1 | 4/2014 | Estock et al. |

FOREIGN PATENT DOCUMENTS

| | | | | |
|---|---|---|---|---|
| WO | 03/039238 A1 | 5/2003 | | |
| WO | WO-2018162680 A1 * | 9/2018 | ......... A01D 41/1243 |

OTHER PUBLICATIONS

European Patent Office, International Search Report related to International Patent Application No. PCT/EP2020/0830SO, mail date Feb. 18, 2021.

* cited by examiner

RESIDUE SPREADER FOR A COMBINE HARVESTER

CROSS-REFERENCE TO RELATED APPLICATION

The present application claims the benefit of and priority from United Kingdom Application Nos. 1917035.6, filed Nov. 22, 2019, the entire disclosure of which is hereby incorporated by reference.

FIELD OF INVENTION

The present invention relates to agricultural harvesters such as combines, and, more particularly, to a tailboard associated with a cutting machine for spreading over the ground chopped material received from the cutting machine.

BACKGROUND OF INVENTION

For many decades, self-propelled combine harvesters have been used by farmers to harvest a wide range of crops including cereals, maize and oil-seed rape. Typically, a combine harvester cuts the crop material, threshes the grain (or seed) therefrom, separates the grain from the crop residue, and cleans the grain before storing in an on-board tank. The crop residue, often referred as MOG (Material Other than Grain), is ejected from the rear of the machine. Depending upon the crop being harvested, the crop residue is usually predominantly straw and referenced as such hereinafter. However, it should be appreciated that references to straw used herein will include any residue crop material discharged by the processor of a combine harvester.

Depending on the requirements of the farmer, the straw is either deposited directly onto the ground in windrows for subsequent baling and removal, or chopped and spread onto the field behind the combine for incorporation back into the soil. Straw choppers are typically fitted at the rear of the combine for chopping the straw ejected from the separating apparatus. The straw choppers are often mounted in a way to allow them to pivot away from path of the discharged straw when not required. Straw spreaders are often provided behind the chopper to receive the chopped straw from the chopper and spread the chopped straw onto the ground.

Several different types of straw spreaders are known. In their simplest form a 'passive' tailboard located immediately behind the straw chopper and provided with directional guide vanes relies upon the momentum of the chopped residue propelled from the straw chopper to spread the material over a spread width. U.S. Pat. No. 6,939,221 discloses an example of a tailboard with deflectors. In another example WO-03/039238 discloses a spreader having adjustable spreader wings.

It is also known to provide 'active' straw spreaders which have rotating impellors, usually two, the impellors imparting a propulsive force to the chopped material to achieve a greater spread width than can normally be achieved with passive spreaders. U.S. Pat. No. 7,331,855 discloses an example of a straw spreader with two counter-rotating impellors.

In addition to achieving a satisfactory spread width, it is also desirable to spread the crop residue evenly across the ground to achieve an even distribution of nutrients provided by the residue, to avoid issues with subsequent tillage operations and to promote even establishment of the next crop. Variables such as the field's terrain, cutting height and wind direction can affect the final placement of the crop residue and, thus, the evenness of distribution.

Current methods to adjust the spread width and pattern include the adjustment of individual deflector plates, changing the angle of the tailboard and/or adjusting the speed of impellors. For example, WO-03/039238 discloses directional vanes, the angle of which is adjusted by an actuator. Furthermore, WO-03/03928 discloses a spreader with spreader wings divided into a left-hand group and a right-hand group, wherein the wings of each group are connected together by a connection element. The two connections elements are interconnected by a transmission member which allows for manual adjustment of the positional relationship between the wings of the two groups.

SUMMARY OF INVENTION

It is an object of the invention to provide an improved tailboard for use in a combine harvester which provides an improved spread control.

According to a first aspect of the present invention, there is provided a residue spreader for receiving crop residue from a residue chopper of a combine harvester and for spreading crop residue onto the ground. The spreader comprises a spreader body having an inlet side and an outlet side. Left and right groups of crop residue deflectors are provided, preferably on the underside of the spreader body. Each deflector is pivotally mounted on the spreader body in juxtaposed position and configured to laterally deflect the crop residue during passage between the inlet side and the outlet side. The deflectors within each group are coupled together for pivoting movement in unison. A distribution actuator is mounted to the spreader body and comprises an actuator body and an actuator element operable to move with respect to the actuator body. The actuator element is coupled to both the left and right groups of deflectors by respective pivoting links. The actuator body is adjustably mounted to the spreader body. An adjustment actuator is connected to the actuator body to control movement of the actuator body with respect to the spreader body.

The advantage of the present invention is delivered by the ability of the tailboard arrangement to permit the adjustment of the spreading width of chopped material over the ground and/or compensation for side winds by adjusting the groups of deflector plates either simultaneously or independently of one another to allow for more or less crop residue to be dispersed to the left or right side as required thereby ensuring a more even distribution of crop residue over the ground.

The distribution actuator is preferably operable to deliver a rotary or oscillating drive to both groups of deflectors via the respective pivoting links so as to swing the deflectors left and right during a harvest operation to produce an even spread pattern. The pivoting links permit movement of the distribution actuator in a direction parallel to the plane of the spreader body, said movement serving to change the effective transverse length of the pivoting links and thus adjust the positional relationship between the deflectors in the left-hand group and the deflectors in the right-hand group. Advantageously, said movement of the distribution actuator can be utilized to adjust the spread width and/or lateral offset of the spread pattern.

In a preferred embodiment the respective pivoting links are pivotally connected to one another at a drive pivot to which the actuator element is pivotally coupled. The drive pivot may conveniently be located in a central zone of the spreader body, proximate to the longitudinal centerline thereof. In such an arrangement the pivoting links share the drive pivot which is driven with an oscillating or rotary motion to repeatedly swing the deflectors left and right.

In one embodiment the distribution actuator is a rotary or orbital motor, wherein the actuator element comprises a crank, and wherein the drive pivot is a crank pin driven by the crank. The rotary motor is operable to deliver a drive that rotates on a drive axis that passed through the spreader body, substantially at 90 degrees. The crank may be provided by a hub that is driven by the motor, the hub comprising a spindle as the crank pin, thereby presenting an eccentric drive arrangement. The rotary motor is preferably hydraulically powered but may alternatively be driven electrically for example.

In an alternative embodiment, an oscillating or transverse drive motion may be generated by a linear actuator, wherein the actuator element is a transversely-displaceable piston connected to the drive pivot. In this case, extension and retraction of the actuator element causes the deflectors of both groups to move left and right in unison.

In accordance with one embodiment of the invention, the distribution actuator is adjustably mounted to the spreader body to permit fore and aft (forward and backward) movement of the actuator body so as to effectively shorten and lengthen the transverse drive connection of both pivoting links together. By shortening the transverse drive connection (through shifting the pivoting links away from a transverse alignment) the spread width may be widened or narrowed depending on how the deflectors are coupled together within the groups. Whether a rotary motor or a linear actuator, the actuator body of the distribution actuator may be slideably mounted on the spreader body, by rails for example, thus allowing for the actuator body to move fore and aft as required.

In accordance with another embodiment of the invention, the distribution actuator is adjustably mounted to the spreader body to permit lateral (left and right) movement of the actuator body so as to offset the spread pattern to the left or right as required.

In one embodiment, the actuator body of the distribution actuator is adjustable in both the fore/aft direction for spread width adjustment, and the left/right direction for lateral offset of the spread pattern. In such an embodiment two adjustment actuators may be provided to control the respective degrees of movement freedom of the actuator body.

When the distribution actuator is a transversely-aligned linear actuator, lateral (left/right) offset of the spread pattern may be controlled by appropriate hydraulic control on the limits of the oscillating motion generated by the distribution actuator.

In one embodiment each deflector is mounted on the underside of said body, wherein each deflector has a respective crank arm which is mounted above the body for pivoting movement around the pivot axis with the associated deflector. The provision of a crank arm above the body allows for control of movement of the deflectors with linkage located away from the flow of residue material. Each crank arm is thus preferably pivotally connected to the connection element of the associated group above the body.

The body is preferably generally planar and may take the form of a tailboard.

Whilst the invention lends itself well to a passive residue spreader, impellors may be provided to achieve wider spreads for applications with wider headers for example. In one embodiment a pair of impellors are journaled to the body on respective upright rotation axes and positioned outboard of the inlet deflectors. In this case, the impellors engage residue material that is incident on the outboard portions of the inlet side. Outermost ones of the deflectors may be configured to channel or deflect residue material accelerated by the impellors.

Aspects of the invention may be embodied in a residue spreading system which includes a controller configured to control pivoting movement of the deflectors. The controller may be an electronic controller with programmable logic for example. In one embodiment movement of the deflectors is controlled in dependence upon a sensed feeding state in association with the crop stream entering or exiting a chopper upstream of the spreader.

In accordance with another aspect of the invention there is provided a residue spreader that comprises a spreader body having an inlet side and an outlet side. Left and right groups of deflectors are provided, each deflector being pivotally mounted on said spreader body in juxtaposed position and configured to laterally deflect the crop residue between the inlet side and the outlet side. The deflectors within each group are coupled together by a respective linkage arrangement for pivoting movement in unison, each linkage arrangement comprising a respective pivoting link. A rotary distribution motor is mounted to the spreader body and configured to drive a crank, wherein the pivoting links are connected to one another at a crank pin driven by the crank.

Advantageously, the pivoting links allow for a rotary motor to be used to drive both groups of deflectors in unison.

BRIEF DESCRIPTION OF THE DRAWINGS

The invention will now be described, by way of example only, with reference to the accompanying drawings, in which.

DETAILED DESCRIPTION

The invention will now be described in the following detailed description with reference to the drawings, wherein preferred embodiments are described in detail to enable practice of the invention. Although the invention is described with reference to these specific preferred embodiments, it will be understood that the invention is not limited to these preferred embodiments. But to the contrary, the invention includes numerous alternatives, modifications and equivalents as will become apparent from consideration of the following detailed description.

Relative terms such as forward, rearward, transverse, lateral, longitudinal and sideways will be made with reference to the normal forward direction of travel of the combine 10 and indicated by arrow F represented in FIG. 1. The terms vertical and horizontal will be made with reference to the level ground 101 upon which the combine 10 is disposed. In other words the Cartesian axes of 'longitudinal', 'transverse', and 'vertical' are made in relation to the frame 12 of combine 10 and are not affected by any slope in the ground. The terms "upstream" and "downstream" are made with reference of the general direction of crop flow along the material conveyance systems described.

Figure 1:
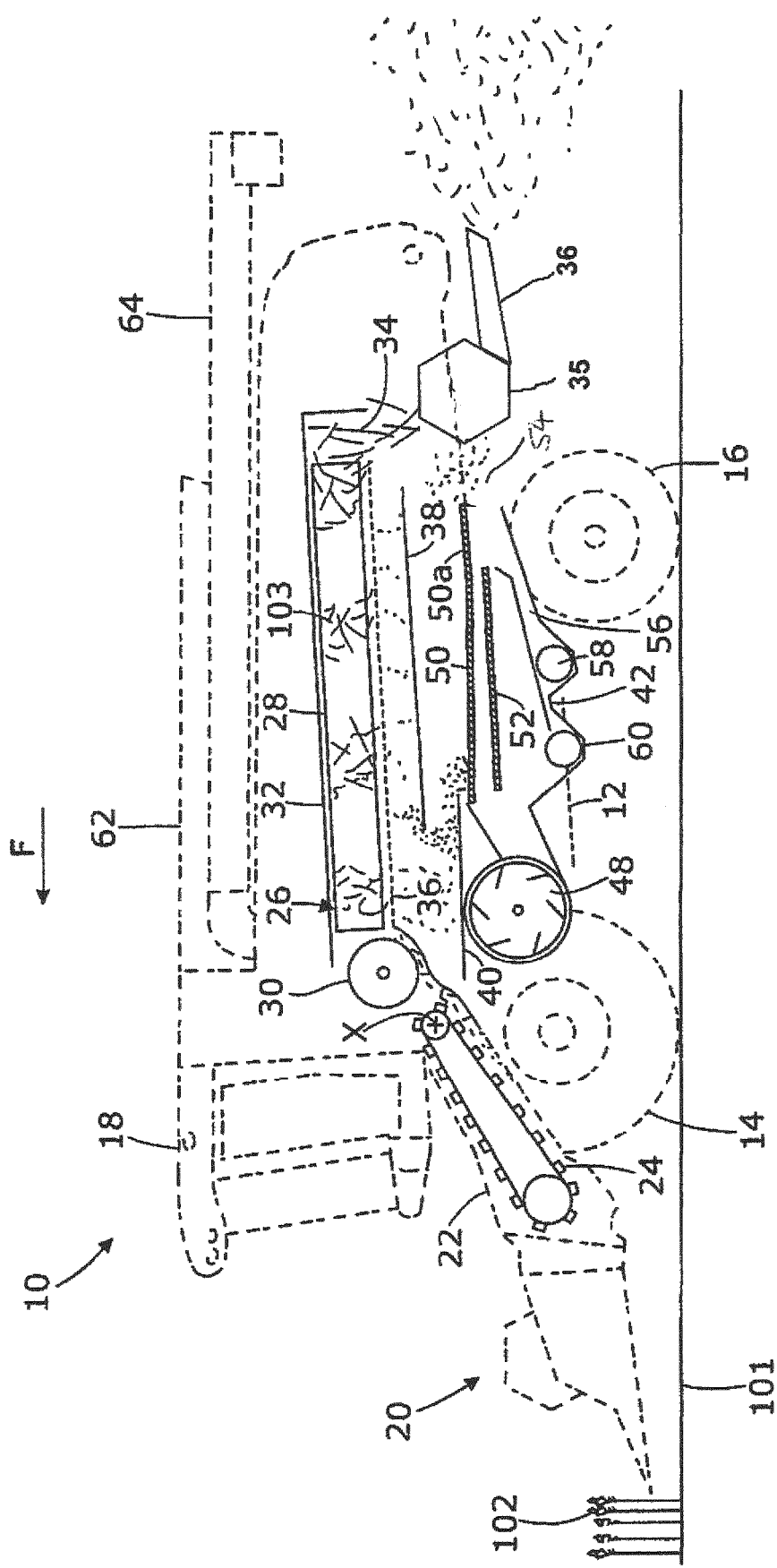
FIG. 1 shows a schematic side view of a known combine harvester comprising a residue spreader positioned after or downstream of a straw chopper.

FIG. 1 illustrates in schematic form the main components of the crop processing system of a combine harvester 10 and will be used to explain the flow of material below. The crop processing system is shown in solid lines whilst the outline profile of harvester 10 is shown in ghost form.

Combine harvester 10, hereinafter referred to as 'combine', includes a frame 12 supported on front wheels 14 and rear steerable wheels 16 which engage the ground 101. A driver's cab 18 is also supported on the frame 12 and houses a driver's station from where a driver controls the combine 10.

A cutting header 20 is detachably supported on the front of a feeder house 22 which is pivotable about a transverse axis x to lift and lower the header 20 in a conventional manner.

The combine 10 is driven in a forward direction (arrow F) across a field of standing crop 102 in a known manner. The header 20 serves to cut and gather the standing crop material before conveying such as a crop material stream into feeder house 22. An elevator 24, normally in the form of a chain and slat conveyor or elevator as shown, is housed within the feeder house 22 and serves to convey the crop material stream upwardly and rearwardly from the header 20 to the crop processor designated generally at 26. At this stage the crop material stream is unprocessed.

The crop processor 26 of the illustrated combine 10 includes a pair of axial flow threshing and separating rotors 28 fed by a tangential flow, crop material impelling, feed beater 30. It should be appreciated however that alternative types of crop processor may be used without deviating from the scope of the invention. For example, the crop processor may instead include a conventional tangential flow threshing cylinder with a plurality of straw walkers for separation. Alternatively, a single axial-flow processing rotor may be employed.

Turning back to FIG. 1, the feed beater 30 rotates on a transverse axis and comprises crop engaging deflectors (not shown) which convey the crop material stream under the beater and into rotor housings 32 which each house one of said rotors 28. It should be appreciated that only the left-hand rotor 28 and housing 32 is shown in FIG. 1 whereas the right-hand equivalent is hidden from view.

The rotors 28 are positioned to have a generally longitudinal, or fore and aft, rotation axis which is normally inclined upwardly towards the rear of the combine 10.

Flighting elements (not shown) provided on the front end of each rotor 28 engage the crop material stream which is then conveyed as a ribbon or mat 103 in a generally rearward axial and helical path in the space between the rotor 28 and the rotor housing 32.

The axial flow rotors 28 serve to thresh the crop stream in a front region, separate the grain therefrom in a rear region, and eject the straw residue via a straw discharge chute 34 provided below a rear portion of the rotors 28, the straw falling either directly onto the ground in a windrow, or via a straw chopper 35 and straw spreader 36 to be described in more detail later.

A part-cylindrical grate 36 provided in the underside of each rotor housing 32 allows the separated material to fall by gravity onto either a return pan 38 located below a rear section of the processor 26, or directly onto a stratification pan 40 located below a front section of the processor 26. In reality the separated material falling through the grate 36 is typically a mix of grain and material other than grain (MOG) which may include chaff, tailings and some straw.

The return pan 38 and stratification pan 40 together serve as a material conveyance system arranged to convey the separated crop material to a grain cleaning shoe designated generally at 42. The pans 38, 40 each include a respective linkage (not shown) to convert a torque source into oscillating motion to oscillate the pans in a generally fore and aft direction. Combined with a transversely rippled or corrugated floor, the oscillating movement of the return pan 38 and stratification pan 40 propels the material generally forwardly or rearwardly respectively.

The return pan 38 "returns" the separated material incident thereon towards the front of the combine 10 (in the direction F) to a front discharge edge 44 from where the material falls or cascades onto the stratification pan 40. The material on the stratification pan 40 is conveyed rearwardly to a rear discharge edge 46 from where the material falls into the cleaning system or "shoe" 42.

The grain-MOG mix falls from the rear discharge edge 46 into the cleaning shoe 42 where the cascading mix is subjected to a cleaning airstream generated by fan 48, before falling onto the front of upper sieve or chaffer 50.

Chaffer 50 comprises adjustable louvres supported on a frame which is driven in fore-and-aft oscillating manner. The material which settles on the chaffer 50 is conveyed in a generally rearward direction and the heavier smaller grain-rich material passes between the louvres onto an underlying lower sieve 52, whereas the lighter larger material (mostly chaff) passes to the end of the chaffer and out of the rear of the machine at shoe outlet 54. A rear section of chaffer 50a is commonly independently adjustable and is configurable to allow tailings to pass there through into a re-threshing region 56 from where the tailings are conveyed via a re-threshing auger 58 back to the processor 26.

Lower sieve 52 is also driven in an oscillating manner to convey the collected grain-MOG mix rearwardly wherein the material falling there through is collected by a clean grain auger 60 for conveyance to an elevator (not shown) for onward conveyance to a grain tank 62. Material which does not pass through lower sieve 52 and is instead conveyed off the rear edge thereof falls into re-threshing region 56 for subsequent re-threshing.

The airstream generated by fan unit 48 is also conveyed by ducting up through lower sieve 52 and chaffer 50 to encourage lifting of the MOG from the chaffer surface.

For completeness the combine 10 includes an unloading system which includes an unloading auger 64.

Figure 2:
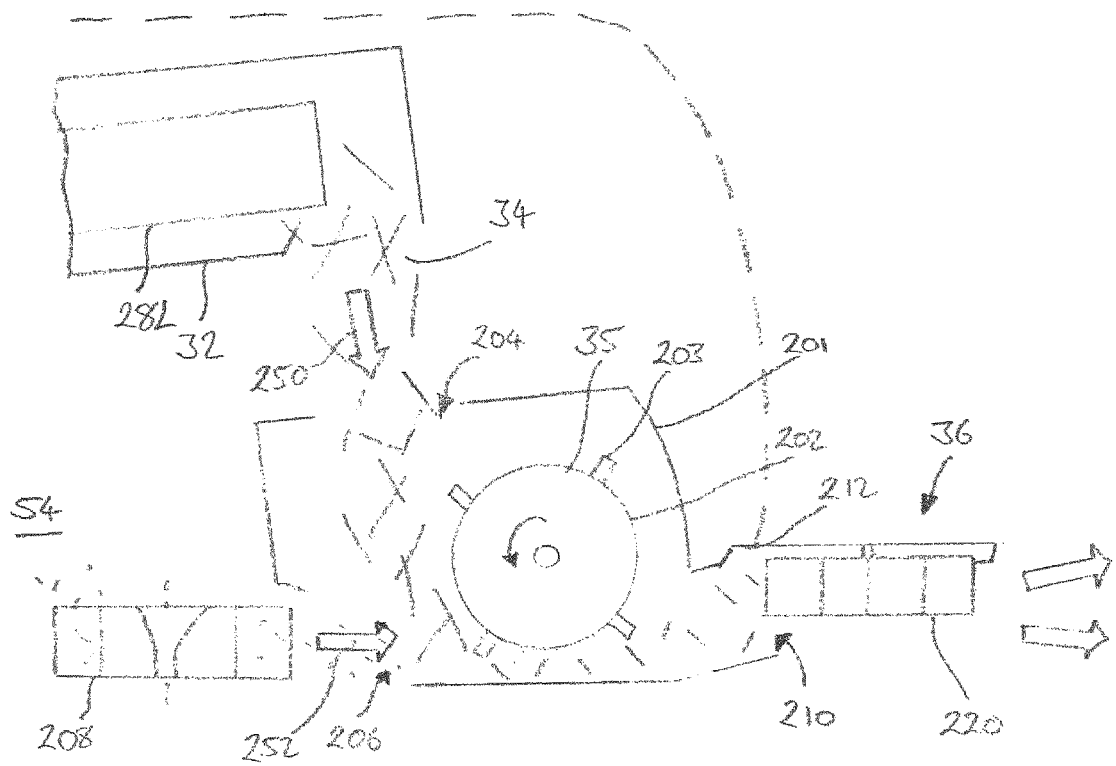
FIG. 2 shows an enlarged schematic side view of a residue handling system located at the rear of a combine harvester in accordance with an embodiment.

Aspects of the invention relate to the handling of the crop residue ejected by the straw chopper 35 and in particular to the straw spreader 36. FIG. 2 shows the passage of straw dropped by the processing rotors 28 and of the chaff from the shoe outlet 54.

The straw chopper 35 has a housing 201 inside which a chopper drum 202 is journaled for rotation on a transverse axis. The chopper drum 202 has sets of knives 203 pivotally mounted to the circumferential surface, the knives 203 interacting with stationary knives (not shown) to chop the material. An upper part of the housing 201 is formed with a first inlet 204 for reception of threshed crop residue (usually and mostly straw) falling from the rear of crop processing rotors 28L, 28R, indicated by arrow 250. Whilst it should be appreciated that only the left-hand rotor 28L can be seen in FIG. 2, both rotors 28L, 28R can be viewed from above in FIG. 3.

A front region of the housing 201 is optionally provided with a second inlet 206 for reception of chaff either directly from the shoe outlet 54 or via a chaff spreader 208 as is known in the art, for example as disclosed in U.S. Pat. No. 6,908,379. The movement of chaff from chaff spreader 208 through the second inlet 206 is indicated by arrow 252.

The residue entering the housing 201 is conveyed tangentially around and under the chopper drum 202, is chopped by the knives 203, and is expelled through an elongate transverse outlet 210 provided in a rear lower region of the housing 201.

A straw spreader 36 is pivotally mounted on the rear part of the combine 10 by being connected proximate to the chopper outlet 210 at a pivot mount 212. The spreader 36 serves to spread the chopped material discharged from the chopper 35 via the outlet 210 on to the ground 101.

Figure 3:
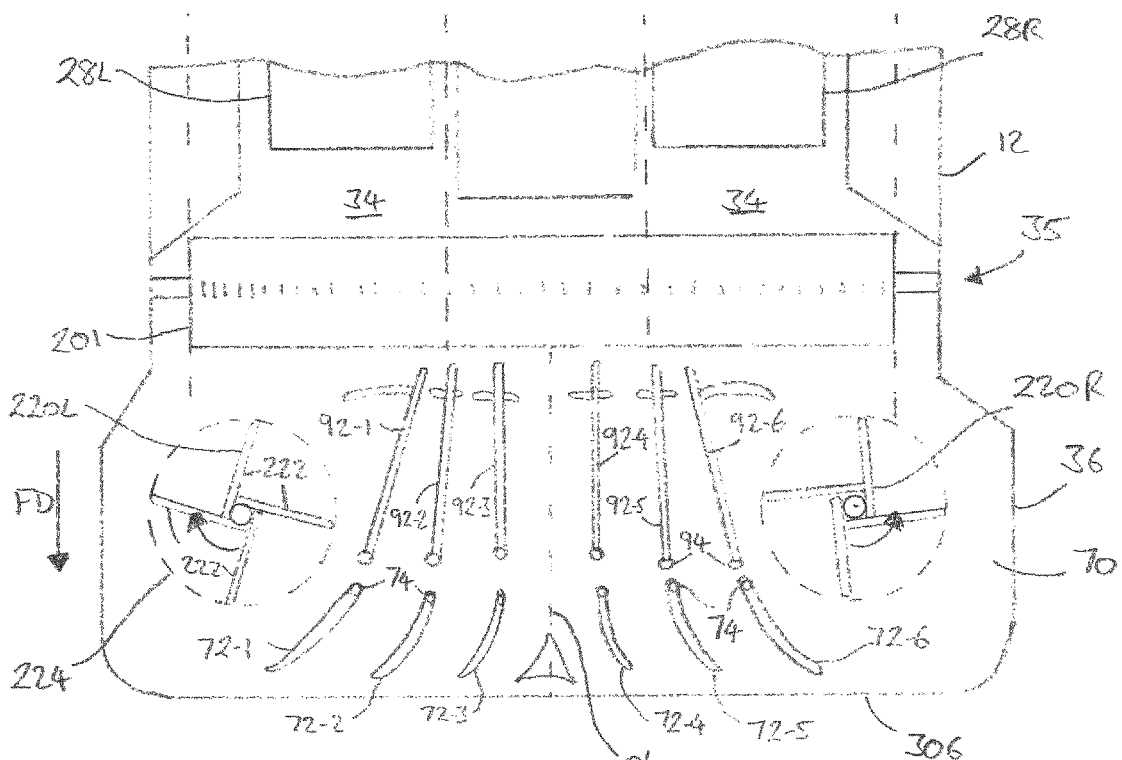
FIG. 3 is a schematic plan view of the residue handling system of FIG. 2, cutaway to reveal the working components.
Figure 4:
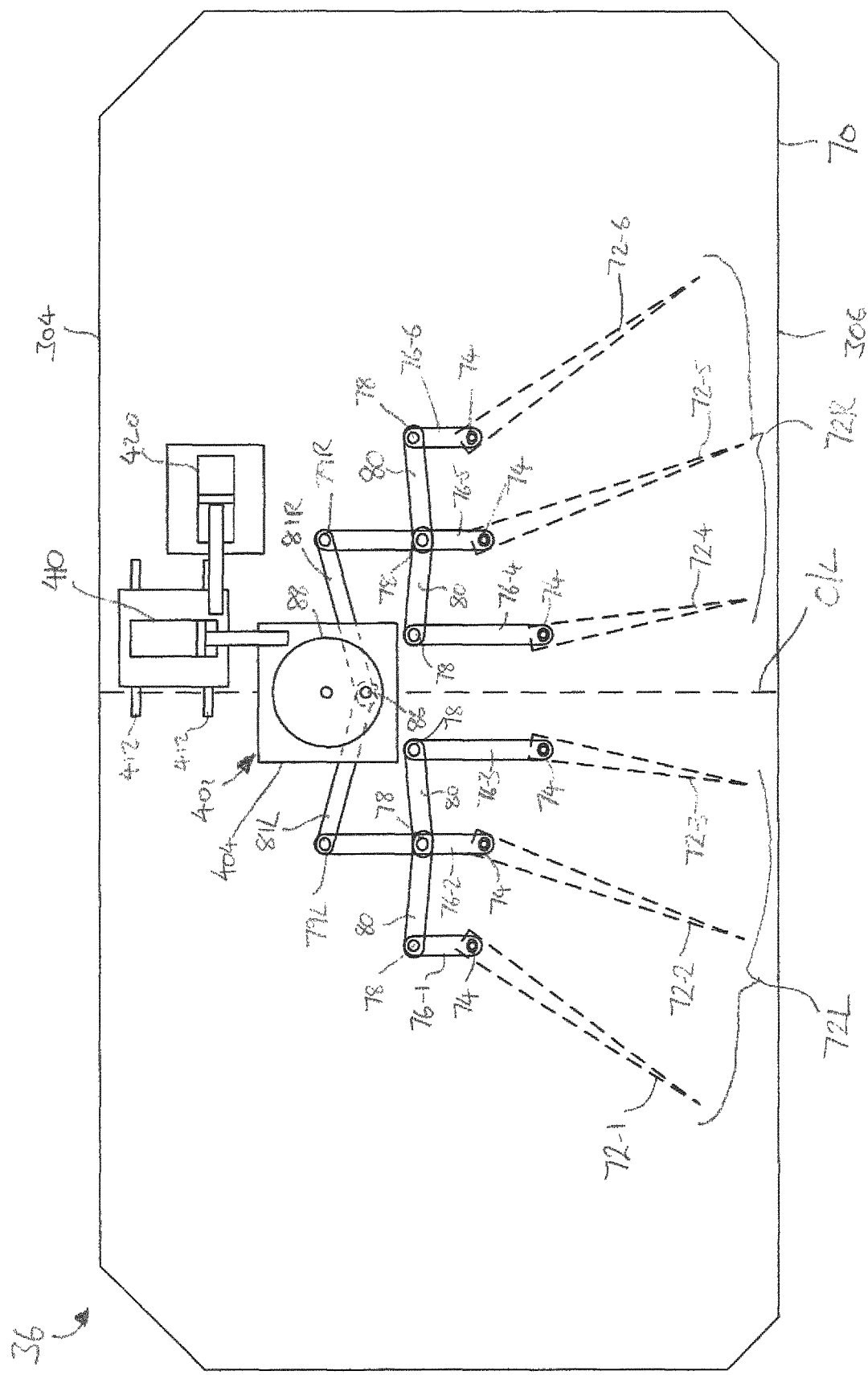
FIG. 4 is a schematic plan view of a residue spreader in accordance with a first embodiment showing the control actuators and linkages in association with the deflectors.

With reference to FIGS. 3 and 4, the straw spreader or tailboard 36 comprises a generally planar body in the form of a base plate 70. The base plate 70 has an inlet side 304 and an outlet side 306. The inlet side 304 extends transversely along a front edge of the tailboard 36 contiguous or adjacent an upper edge of the chopper outlet 210. The outlet side 306 extends transversely along a rear edge of the tailboard 36. Chopped crop residue exiting through the chopper outlet 210 is thrown up against the underside of the base plate 70 and directed in a generally rearward direction of flow (indicated by arrow FD) from the inlet side 304 to the outlet side 306.

The spreader 36 of FIG. 3 comprises two sets of deflectors in the form of deflector plates mounted on the underside of the base plate 70 and shaped and arranged so that chopped material exiting from the outlet 210 impacts the deflector plates causing a lateral change in direction of the material.

Firstly, a set of six outlet (or output) deflectors 72 (labelled as 72-1 to 72-6), are provided, each outlet deflector 72 being pivotally mounted on the underside of the base plate 70 in juxtaposed position and configured to laterally deflect the crop residue between the inlet side 304 and the outlet side 306. The outlet deflectors 72 are pivotally connected to the base plate 70 at respective pivoting connections 74 in a juxtaposed relationship. Each outlet deflector 72 extends generally rearwards, or in the direction of crop conveyance, from the respective pivot axis 74 towards the outlet side 306.

Each outlet deflector 72 extends generally perpendicularly to the plane of the base plate 70 with a curved (FIG. 3) or straight (FIG. 4) cross-sectional profile within that plane. Each outlet deflector 72 protrudes generally downwards to present a deflecting surface which engages the residue material passing along the underside of the base plate 70. As shown in FIG. 3, the curved profile of the output deflector plates 72 changes to the left and right of the set such as to divert the cut material away from the centerline of the spreader (represented by C/L) which aligns with the centerline of the combine harvester 10.

The outlet deflectors 72 are preferably made from plastic, or sheet metal or the like.

The six outlet deflectors 72 are divided into a left-hand group 72L of three outlet deflectors 72-1, 72-2, 72-3, and a right-hand group 72R of three outlet deflectors 72-4, 72-5, 72-6. The deflectors 72 within each group of outlet deflectors 72L, 72R are coupled together so that they move in unison.

Although illustrated and described as having six outlet deflectors 72 in two groups of three deflectors, it should be appreciated that more or less than six deflectors can be provided.

Secondly, with reference again to FIG. 3, an optional set of six inlet (or input) deflectors 92 (labelled in FIGS. 3 and 4 as 92-1 to 92-6), are provided, each inlet deflector 92 being pivotally mounted on the underside of the base plate 70 in juxtaposed position and configured to laterally deflect the crop residue between the inlet side 304 and the outlet deflectors 72. The inlet deflectors 92 are pivotally connected to the base plate 70 at respective pivoting connections 94 in a juxtaposed relationship. Each inlet deflector 92 extends generally forwards, or counter to the direction of crop conveyance, from the respective pivot axis 94 towards the inlet side 304.

Each inlet deflector 92 extends generally perpendicularly to the plane of the base plate 70 with a preferably straight cross-sectional profile within that plane. Each outlet deflector 92 protrudes generally downwards to present a deflecting surface which engages the residue material passing along the underside of the base plate 70.

The inlet deflectors 92 are preferably made from plastic, or sheet metal or the like.

The six inlet deflectors 92 are optionally divided into a left-hand group of three inlet deflectors 92-1, 92-2, 92-3, and a right-hand group of three inlet deflectors 92-4, 92-5, 92-6. The deflectors 92 within each group of inlet deflectors are coupled together so that they move in unison.

Each group of inlet deflectors may have coupled thereto an actuator (not shown) which is mounted to the upper side of the base plate 70 and connected to one of the inlet deflectors 92 in the group through a preferably arcuate slot provided in the base plate 70. Left and right pivoting of the groups of deflectors can then be controlled by the actuators.

With reference to FIGS. 2 and 3, the straw spreader 36 may optionally include impellors 220 journaled to the underside of the base plate 70. In the preferred arrangement shown, two impellors 220L, 220R are each journaled to the underside of the base plate 70 on respective upright rotation axes and positioned outboard of the inlet deflectors 92. The impellors 220 each comprise a plurality of impellor blades 222 which rotate to define a cylindrical swept envelope 224.

The impellors 220 are operable to engage residue material ejected from the outboard regions of chopper outlet 210 and incident upon the outboard regions of inlet side 304. The engaged material is propelled generally rearwardly by the impellors 220 and is steered of guided laterally by the outermost inlet deflectors 91-1, 92-6, and the outermost outlet deflectors 72-1, 72-6.

In an alternative embodiment the actuators 482 are omitted and the inlet deflectors 92 are adjusted manually and held in position by appropriate fastening means such as threaded bolts that pass through arcuate slots in the base plate 70, and nuts that grip the base plate 70. Even with manual adjustment, the inlet deflectors 92 may be coupled together with link arms in one or more groups to assist the manual adjustment. In an alternative embodiment the inlet deflectors 92 are fixedly mounted to the base plate 70 with no freedom to pivot. In other embodiments, such as that shown in FIG. 4, the inlet deflectors are omitted completely.

Turning to FIG. 4, a residue spreader in accordance with an embodiment is shown, wherein only outlet deflectors 72 are included, shown as having a straight profile and mounted under the body 70. Attached to each of the outlet (or output) deflectors 72 at its pivoting connection 74 is a respective crank arm 76 (labelled as 76-1 to 76-6) extending generally in the opposite direction to the respective deflector 72. The pivoting connections 74 may include a vertical pin passing through the body 70 and retained in position with suitable bearings and fastenings. The deflectors 72 and crank arms 76 pivot together and so, in one embodiment, may be keyed to the respective pin passing through the pivoting connection 74 so as to rotate therewith.

The crank arms 76 and linkage described hereinafter are conveniently mounted above the body 70 so as to keep it separate from the flow of residue material.

The distal (free) end of each crank arm 76 in each group is connected to adjacent crank arms 76 within each group by connection elements 80 or a common crossbar at respective pivotal connections 78. The connection elements 80 serve to couple together the deflectors 72 within the associated group so that they move together in unison. Moving one of these connection elements 80 to the left or right causes the connected deflectors 72 to swing to the right or left about the respective pivoting connection 74.

One deflector 72 from each group 72L, 72R of deflectors has an associated extended crank arm, 76-2 and 76-5 in the embodiment of FIG. 4. Each extended crank arm 76-2, 76-4 is connected at a respective pivot 79L, 79R to outboard ends of respective pivoting link 81L, 81R. Inboard ends of the respective pivoting links 81L, 81R are pivotally connected to one another at a drive pivot 86 to which an actuator element (in the form of a hub 88) of a distribution actuator 401 is pivotally coupled.

Figure 5:
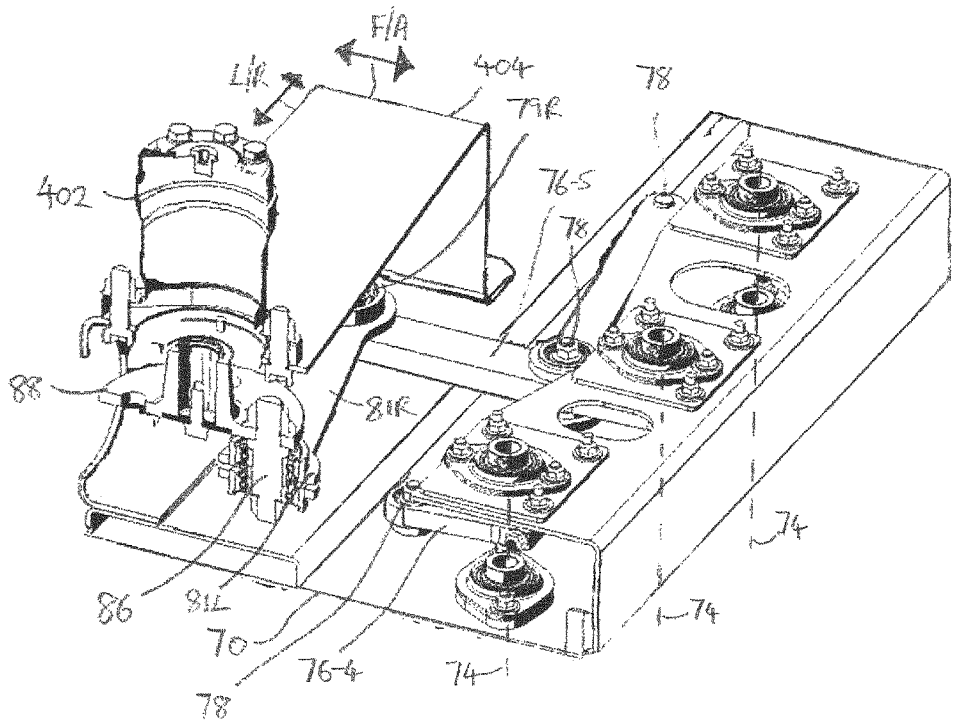
FIG. 5 is a perspective view of part of a spreader in accordance with an embodiment, the spreader being shown as cutaway along a central longitudinal vertical plane indicated as C/L in FIG. 4.

The distribution actuator 401 in the embodiment of FIG. 4 is a hydraulic rotary motor having an actuator body 402 and the rotary hub 88, shown also in FIG. 5. The hub 88 acts as a crank wherein a crank pin or spindle is radially offset from the rotation center of the hub 88, the crank pin providing the drive pivot 86. Together the hub 88 and drive pivot 86 deliver an eccentric drive mechanism which delivers an oscillating (left-right) drive motion to both groups of deflectors 72L, 72R in unison.

It should be understood that the hub could alternatively be replaced with a simple crank and pin mechanism.

The body 402 of motor 401 is mounted to the spreader body 70 so as to permit at least one of fore/aft movement and left/right adjustment movement indicated by arrows F/A and L/R in FIG. 5. Such movement freedom may be enabled by a suitable rail mechanism between a platform 404 to which the motor is secured, and the spreader body 70.

Fore and aft movement of the motor body 402 is controlled by a linear spread width adjustment actuator 410 which is mounted to the spreader body 70 and connected to the motor body 402, for example by attachment to platform 404. Fore and aft movement of the motor body 402 causes a change in the effective transverse length of the pivoting links 81. Best illustrated in FIG. 4, any increase in the angle of the pivoting links 81 away from a straight or transverse line (for example parallel with inlet edge 304) causes both groups of deflectors 72L, 72R to be 'pushed out' in unison which, in turn, increases the overall spread width.

Left and right movement of the motor body 402 is controlled by a linear offset adjustment actuator 420 which is mounted to the spreader body 70 and connected to the motor body 402 via the spread width adjustment actuator 410. To enable the left and right movement to be translated to the motor body 402, the spread width adjustment actuator 410 is slideably mounted to spreader body 70 on transverse rails 412. Left and right movement of the motor body 402, away from the center line C/L for instance, offsets the spread width to the left or right as both groups of deflectors 72L, 72R are offset in the same direction in unison.

Figure 6:
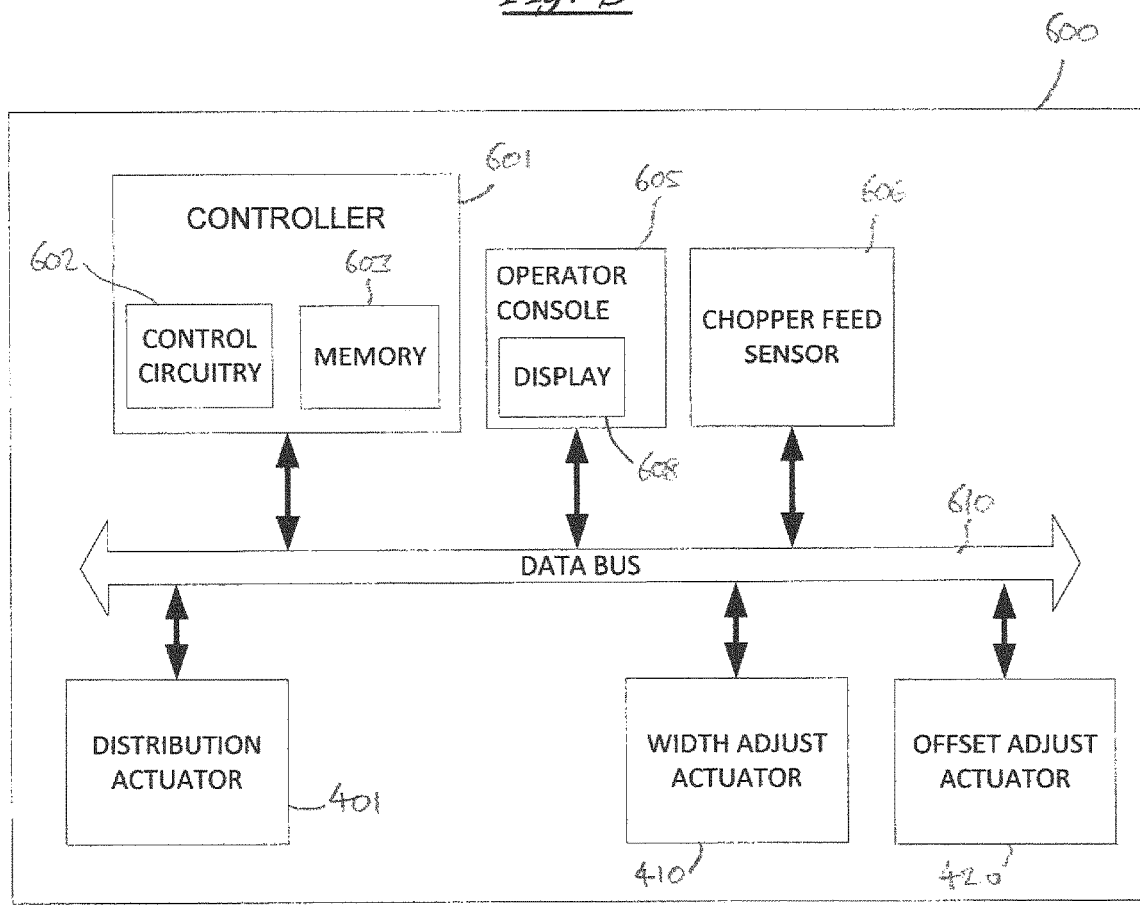
FIG. 6 is a block diagram of a residue spreading system in accordance with an embodiment; and, FIG. 7 is a schematic plan view of a residue spreader in accordance with a second embodiment showing the control actuators and linkages in association with the deflectors.

With reference to FIG. 6, a residue spreading system 600 comprises an electronic control unit (hereinafter termed 'ECU') 601 which is in communication (via a data bus 610 for example) with an operator console 605, a chopper feed sensor 606, and the control actuators 401, 410, 420. The ECU 601 comprise control circuitry 602 which may be embodied as custom made or commercially available processor, a central processing unit or an auxiliary processor among several processors, a semi-conductor based microprocessor (in the form of a micro-chip), a macro processor, one or more applications specific integrated circuits, a plurality of suitably configured digital logic gates, and/or other well-known electrical configurations comprising discrete elements both individually and in various combinations to coordinate the overall operation of the combine 10.

The ECU 601 further comprises memory 603. The memory 603 may include any one of a combination of volatile memory elements and non-volatile memory elements. The memory 603 may store a native operating system, one or more native applications, emulation systems, emulated applications for any of a variety of operating systems and/or emulated hardware platforms, emulated operating systems etc. The memory 603 may be separate from the ECU 601 or may be omitted.

The operator console 605 comprises a display 608 which may be integrated as part of a terminal having user interface devices such as buttons, levers and switches. The console 605 is mounted proximate to a drivers work station in cab 18.

The chopper feed sensor 606 may be located upstream of the chopper 35, for example in the vicinity of the straw discharge chute 34, and configured to generate electrical signals that are representative of the feeding state of the chopper 35. For example, the feed sensor 606 may indicate wide, narrow or offset feeding of the residue material to the chopper 35.

In one embodiment the ECU 601 is configured to control movement of the deflectors 72 in dependence upon signals received from the feed sensor 606 or other sensed parameter that is indicative of the feeding state of the residue upstream of the chopper 35 or the spreader 36.

During operation the distribution actuator 401 is operable to control movement of both the left and right groups of deflectors in common. In one mode of operation the distribution actuator 401 may be controlled to oscillate left and right causing all deflectors to repeatedly swing left and right in order to deliver an even spread distribution across the spread width. In addition, the adjustment actuators 410, 420 can be adjusted to increasing, decreasing or offsetting the spread width.

Figure 7:
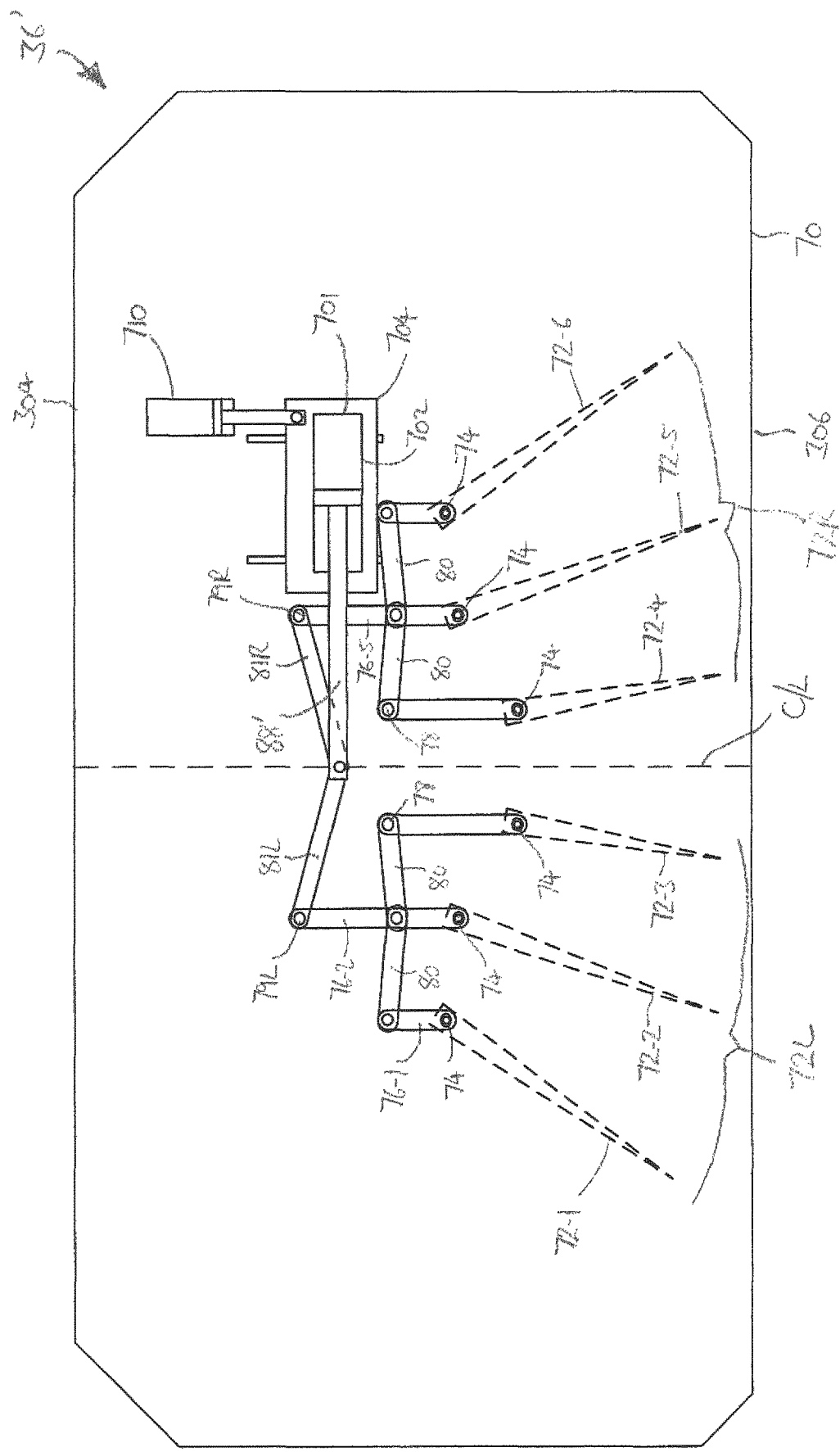

FIG. 7 shows a spreader 36' in accordance with an alternative embodiment. The spreader of 36' is the same as that described above with reference to FIG. 4 except that the rotary distribution actuator 401 has been replaced with a linear distribution actuator 701, and that the offset adjustment actuator 420 is omitted. The linear distribution actuator 701 may be a hydraulic cylinder or a linear electric actuator that, in one mode of operation, oscillated left and right so as to swing the deflectors repeatedly to achieve an even spread of residue. The actuator 701 has a body 702 and an actuator element, in this example formed by the piston and rod 88'.

In a similar manner to the embodiment of FIG. 4, fore and aft movement of the actuator 702 is controlled by a linear spread width adjustment actuator 710 which is mounted to the spreader body 70 and connected to the actuator body 702, for example by attachment to platform 704. As in the previous embodiment, the provision of a drive pivot between the pivoting links 81 allows for the fore and aft freedom of movement of the distribution actuator 701. Fore and aft movement of the actuator body 702 causes a change in the effective transverse length of the pivoting links 81 thus altering the spread width.

In summary there is provided a residue spreader for receiving crop residue from a residue chopper of a combine harvester and for spreading crop residue onto the ground. The spreader includes a spreader body having an inlet side and an outlet side. Left and right groups of deflectors are provided, each deflector being pivotally mounted on said spreader body in juxtaposed position and configured to laterally deflect the crop residue between the inlet side and the outlet side. The deflectors within each group are coupled together for pivoting movement in unison. A distribution actuator has an actuator body and an actuator element. The actuator body is mounted to the spreader body. The actuator element is coupled to both the left and right groups of deflectors by respective pivoting links. The actuator body is adjustably mounted to the spreader body. An adjustment actuator is connected to the actuator body to control movement of the actuator body with respect to the spreader body so as to adjust a spread width.

All references cited herein are incorporated herein in their entireties. If there is a conflict between definitions herein and in an incorporated reference, the definition herein shall control.

Clearly the skilled person will recognize that various aspects, embodiments and elements of the present application, including as illustrated in the figures, may be arranged in differing combinations, any and all of which may be considered to fall within the ambit of the inventive concept. The invention will be defined by the following claims.

The invention claimed is:

1. A residue spreader for receiving crop residue from a residue chopper of a combine harvester and for spreading crop residue onto the ground, the spreader comprising:
a spreader body having an inlet side and an outlet side;
left and right groups of deflectors, each deflector being pivotally mounted on the spreader body in juxtaposed position and configured to laterally deflect the crop residue between the inlet side and the outlet side, wherein the deflectors within each group are coupled together for pivoting movement in unison;
a distribution actuator mounted to the spreader body and comprising an actuator body and an actuator element, wherein the actuator element is coupled to both the left and right groups of deflectors by respective pivoting links, wherein the actuator body is adjustably mounted to the spreader body, wherein the distribution actuator is a rotary or orbital motor, wherein the respective pivoting links are pivotally connected to one another at a drive pivot to which the actuator element is pivotally coupled, and wherein the actuator element comprises a crank, and wherein the drive pivot is a crank pin driven by the crank; and
an adjustment actuator connected to the actuator body to control movement of the actuator body with respect to the spreader body, wherein the adjustment actuator is a linear spread width adjustment actuator configured to control fore and aft movement of the actuator body, wherein the linear spread width adjustment actuator is transversably slideably mounted to the spreader body, and wherein the spreader further comprises an offset adjustment actuator connected to the linear spread width actuator to control transverse movement of the spread width actuator and the distribution actuator with respect to the spreader body.

2. The residue spreader of claim 1, wherein a hub comprises the crank and crank pin.

3. The residue spreader of claim 1, wherein the rotary or orbital motor is hydraulically powered.

4. The residue spreader of claim 1, wherein each deflector is mounted on an underside of the spreader body, wherein each deflector comprises a respective crank arm mounted above the spreader body for pivoting movement around a respective pivot axis with the associated deflector.

5. The residue spreader of claim 4, wherein each crank arm is pivotally connected to a respective common connection element for each group of deflectors.

6. The residue spreader of claim 1, further comprising a plurality of inlet deflectors, each inlet deflector being pivotally mounted on the spreader body in juxtaposed positions and extending forwards from a respective pivot axis towards the inlet side and configured to laterally deflect the crop residue between the inlet side and the outlet side upstream of a plurality of outlet deflectors.

7. The residue spreader of claim 6, wherein the pivotal mountings of each of the inlet deflectors are aligned with pivotal mountings of the outlet deflectors in a fore and aft direction between the inlet side and the outlet side.

8. The residue spreader of claim 1, further comprising a pair of impellors journaled to the spreader body on respective upright rotation axes and positioned outboard of the deflectors.

9. A residue spreading system comprising the residue spreader of claim 1, and a electronic control unit configured to control the distribution actuator and the adjustment actuators based upon a sensed feeding state.

10. A combine harvester comprising a straw chopper and the residue spreader of claim 1, wherein the residue spreader is mounted immediately downstream of the straw chopper.

* * * * *